United States Patent
Short

(10) Patent No.: US 12,397,602 B2
(45) Date of Patent: Aug. 26, 2025

(54) AGRICULTURAL MACHINE SUSPENSION CONTROL SYSTEM

(71) Applicant: Deere & Company, Moline, IL (US)

(72) Inventor: Daniel T. Short, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 1113 days.

(21) Appl. No.: 17/064,877

(22) Filed: Oct. 7, 2020

(65) Prior Publication Data

US 2022/0105767 A1 Apr. 7, 2022

(51) Int. Cl.

| | | |
|---|---|---|
| *B60G 17/016* | (2006.01) | |
| *A01B 76/00* | (2006.01) | |
| *A01C 23/00* | (2006.01) | |
| *A01C 23/04* | (2006.01) | |
| *A01M 7/00* | (2006.01) | |
| *B60G 17/015* | (2006.01) | |
| *B60G 17/052* | (2006.01) | |

(52) U.S. Cl.
CPC ............ *B60G 17/016* (2013.01); *A01B 76/00* (2013.01); *A01C 23/008* (2013.01); *A01C 23/047* (2013.01); *A01M 7/0042* (2013.01); *A01M 7/0082* (2013.01); *B60G 17/0155* (2013.01); *B60G 17/052* (2013.01); *B60G 2202/152* (2013.01); *B60G 2204/62* (2013.01); *B60G 2300/083* (2013.01); *B60G 2400/60* (2013.01); *B60G 2500/201* (2013.01); *B60G 2500/30* (2013.01); *B60G 2600/182* (2013.01); *B60G 2800/16* (2013.01)

(58) Field of Classification Search
CPC ......................... B60G 17/016; B60G 17/0155; B60G 17/052; B60G 2202/152; B60G 2204/62; B60G 2400/60; A01B 76/00
See application file for complete search history.

(56) References Cited

U.S. PATENT DOCUMENTS

| 4,341,398 A | 7/1982 | Condon et al. |
|---|---|---|
| 6,428,024 B1 * | 8/2002 | Heyring ............. B60G 21/0555 280/124.16 |

(Continued)

FOREIGN PATENT DOCUMENTS

EP 3549441 A1 10/2019

OTHER PUBLICATIONS

Car and Driver "The Benefits and Drawbacks of an Air Suspension System" 8 pages, accessed Sep. 2, 2020.

(Continued)

*Primary Examiner* — Frank B Vanaman
(74) *Attorney, Agent, or Firm* — Christopher J. Volkmann; KELLY, HOLT & CHRISTENSON P.L.L.C.

(57) ABSTRACT

An agricultural machine includes a frame, a ground-engaging element, a suspension system that movably supports the frame relative to the ground-engaging element, wherein the suspension system is configured to apply, for a given displacement of the frame relative to the ground-engaging element, a force based on a force-to-displacement relationship. A control system is configured to receive an input indicative of an operational state of the agricultural machine during operation on a terrain, and automatically control the suspension system to adjust the force-to-displacement relationship of the suspension system based on the operational state.

17 Claims, 14 Drawing Sheets

(56) References Cited

U.S. PATENT DOCUMENTS

| | | | |
|---|---|---|---|
| 6,578,855 B2 | 6/2003 | Wallestad | |
| 8,589,049 B2* | 11/2013 | Craig | B60W 40/02 |
| | | | 701/80 |
| 8,973,922 B2 | 3/2015 | Koelzer | |
| 2004/0245732 A1* | 12/2004 | Kotulla | B60G 21/06 |
| | | | 280/124.16 |
| 2005/0021205 A1* | 1/2005 | Niwa | B60G 17/016 |
| | | | 701/37 |
| 2006/0082092 A1* | 4/2006 | Dean | F16F 9/3207 |
| | | | 280/93.512 |
| 2007/0282498 A1* | 12/2007 | Holbrook | B60G 17/0162 |
| | | | 701/37 |
| 2008/0272562 A1* | 11/2008 | Sabelstrom | B60G 11/27 |
| | | | 280/6.153 |
| 2011/0266410 A1* | 11/2011 | Khajepour | B60G 21/067 |
| | | | 248/560 |
| 2013/0125800 A1* | 5/2013 | Landphair | A01B 79/005 |
| | | | 701/32.4 |
| 2016/0041803 A1* | 2/2016 | Markov | G06F 3/147 |
| | | | 701/48 |
| 2016/0059662 A1* | 3/2016 | Slawson | A01C 23/047 |
| | | | 280/6.157 |
| 2017/0106710 A1* | 4/2017 | Giuliani | B60G 17/08 |
| 2017/0300219 A1* | 10/2017 | Buchner | B60K 35/00 |
| 2018/0186208 A1* | 7/2018 | Coombs | G01G 19/10 |
| 2018/0281545 A1 | 10/2018 | Kerner et al. | |
| 2019/0039431 A1* | 2/2019 | Vaughan | F15B 13/0406 |
| 2019/0176559 A1 | 6/2019 | Bittner et al. | |
| 2020/0346510 A1* | 11/2020 | Johansson | B60G 17/0182 |

OTHER PUBLICATIONS

Monroe Shocks & Struts "Shocks vs. Struts" 4 pages, accessed Sep. 2, 2020.
Wikipedia "Air Suspension" 9 pages, Accessed Sep. 2, 2020.
Extended European Search Report and Written Opinion issued in European Patent Application No. 21200302.4, dated Feb. 23, 2022, in 08 pages.
Barksdale Control Products | Jul. 22, 2020, Atlas Valve—Series 52334, 2 pages.
Barksdale Control Products | Jul. 22, 2020, Dual Ride Height Valve—52334 Series (Atlas Valve), 1 page.

* cited by examiner

AGRICULTURAL MACHINE SUSPENSION CONTROL SYSTEM

FIELD OF THE DESCRIPTION

The present description generally relates to suspension systems for mobile work machines. More specifically, but not by limitation, the present description relates to a control system that adjusts or tunes an agricultural machine suspension based on detecting a state of the machine or environment during operation of the machine.

BACKGROUND

There are many different types of mobile work machines. Examples include, but are not limited to, agricultural machines, construction machines, turf management machines, forestry machines, among others. Some examples of agricultural machines include sprayers, tractors, harvesters, planters, seeders, to name a few. Many of these machines include a suspension system having components such as springs (e.g., air springs, etc.), shock absorbers, and other linkages that connect the machine to wheels, tracks, or other ground-engaging elements.

The discussion above is merely provided for general background information and is not intended to be used as an aid in determining the scope of the claimed subject matter.

SUMMARY

An agricultural machine includes a frame, a ground-engaging element, a suspension system that movably supports the frame relative to the ground-engaging element, wherein the suspension system is configured to apply, for a given displacement of the frame relative to the ground-engaging element, a force based on a force-to-displacement relationship. A control system is configured to receive an input indicative of an operational state of the agricultural machine during operation on a terrain, and automatically control the suspension system to adjust the force-to-displacement relationship of the suspension system based on the operational state.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 8-1 and 8-2 (collectively referred to as FIG. 8) is a flow diagram illustrating an example operation to control a suspension system of an agricultural machine.

DETAILED DESCRIPTION

The present description generally relates to suspension systems for mobile work machines. More specifically, but not by limitation, the present description relates to a control system that adjusts or tunes an agricultural machine suspension based on detecting a state of the machine or environment during operation of the machine.

There are many different types of mobile work machines that utilize suspension systems. Examples include, but are not limited to, agricultural machines, construction machines, turf management machines, forestry machines, among others. Some examples of agricultural machines include sprayers, tractors, harvesters, planters, seeders, to name a few. For sake of illustration, but not by limitation, the present disclosure will be provided in the context of an agricultural sprayer or spraying machine. However, it will be understood that the present features can be utilized with other types of agricultural machines, as well as other types of mobile work machines.

Figure 1:
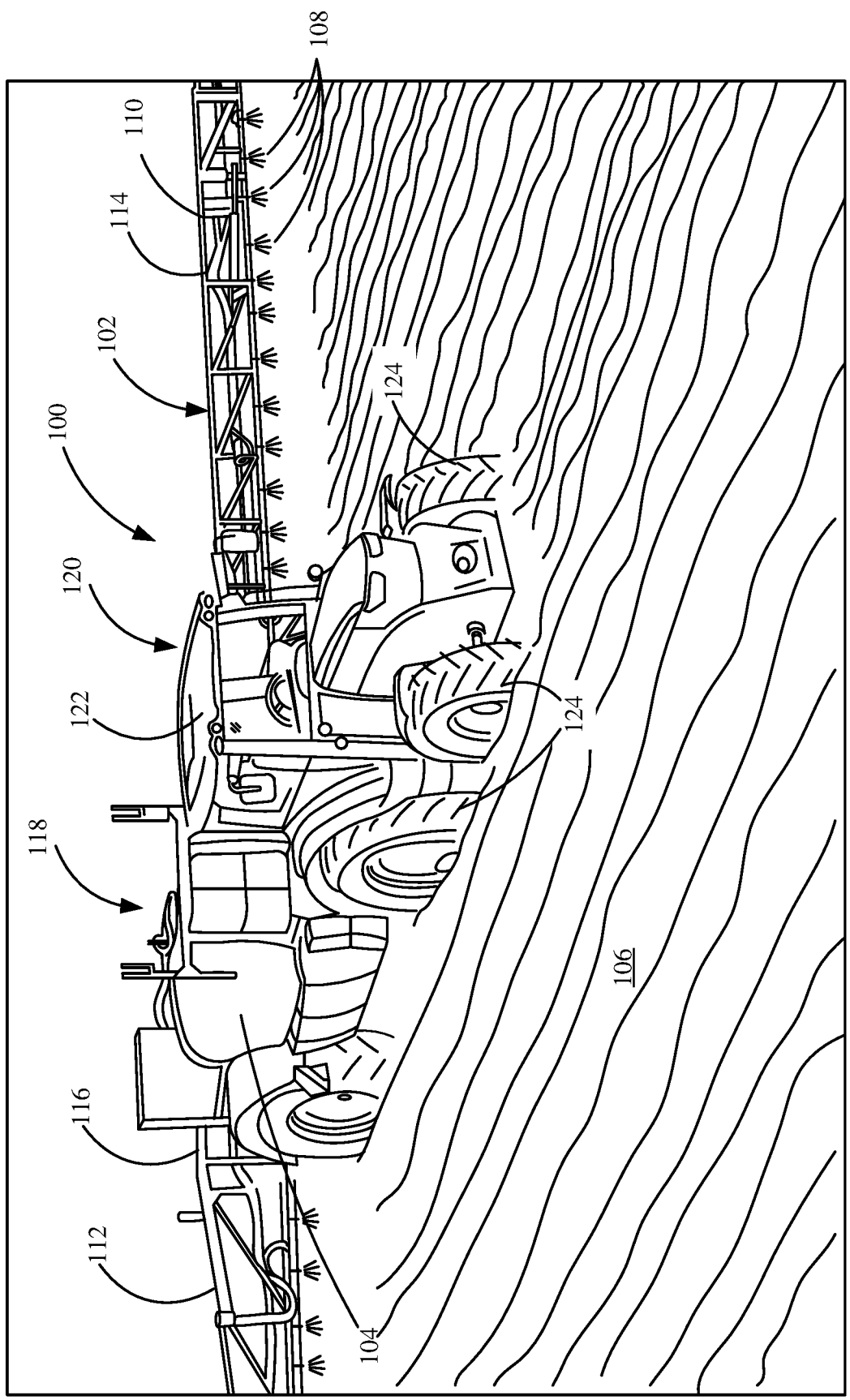
FIG. 1 illustrates an example agricultural sprayer.

FIG. 1 illustrates an agricultural spraying machine (or agricultural sprayer) 100. Sprayer 100 includes a spraying system 102 having a tank 104 containing a liquid that is to be applied to field 106. Tank 104 is fluidically coupled to spray nozzles 108 by a delivery system comprising a set of conduits. A fluid pump is configured to pump the liquid from tank 104 through the conduits through nozzles 108. Spray nozzles 108 are coupled to, and spaced apart along, boom 110. Boom 110 includes arms 112 and 114 which can articulate or pivot relative to a center frame 116. Thus, arms 112 and 114 are movable between a storage or transport position and an extended or deployed position (shown in FIG. 1).

In the example illustrated in FIG. 1, sprayer 100 comprises a towed implement 118 that carries the spraying system, and is towed by a towing or support machine 120 (illustratively a tractor) having an operator compartment or cab 122. Sprayer 100 includes a set of traction elements, such as wheels 124. The traction elements can also be tracks, or other traction elements as well. It is noted that in other examples, sprayer 100 is self-propelled. That is, rather than being towed by a towing machine, the machine that carries the spraying system also includes propulsion and steering systems.

Figure 2:
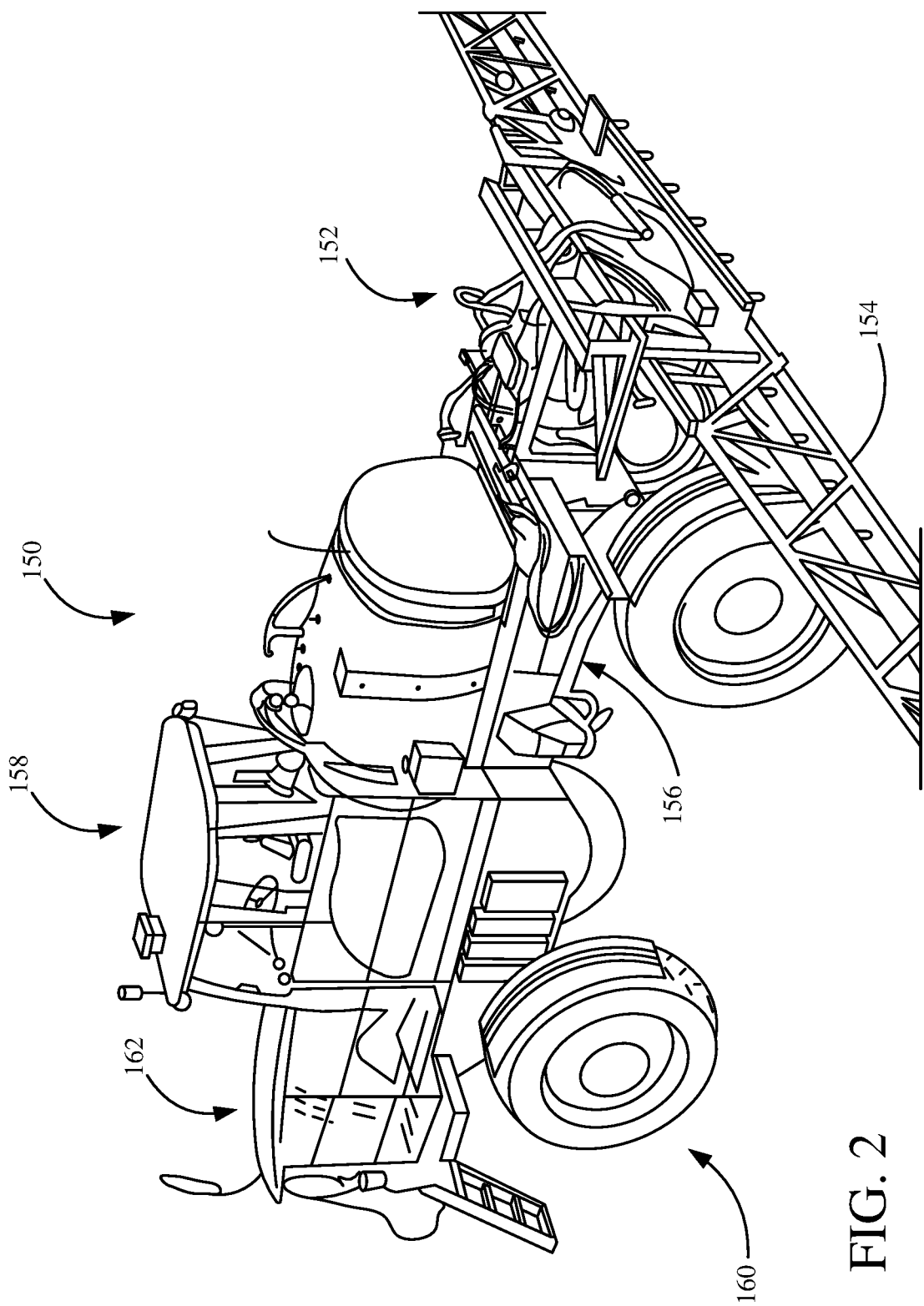
FIG. 2 illustrates an example agricultural sprayer.

FIG. 2 illustrates one example of an agricultural sprayer 150 that is self-propelled. That is, sprayer 150 has an on-board spraying system 152, that is carried on a machine frame 156 having an operator compartment 158, a steering system 160 (e.g., wheels or other traction elements), and a propulsion system 162 (e.g., internal combustion engine).

Figure 3:
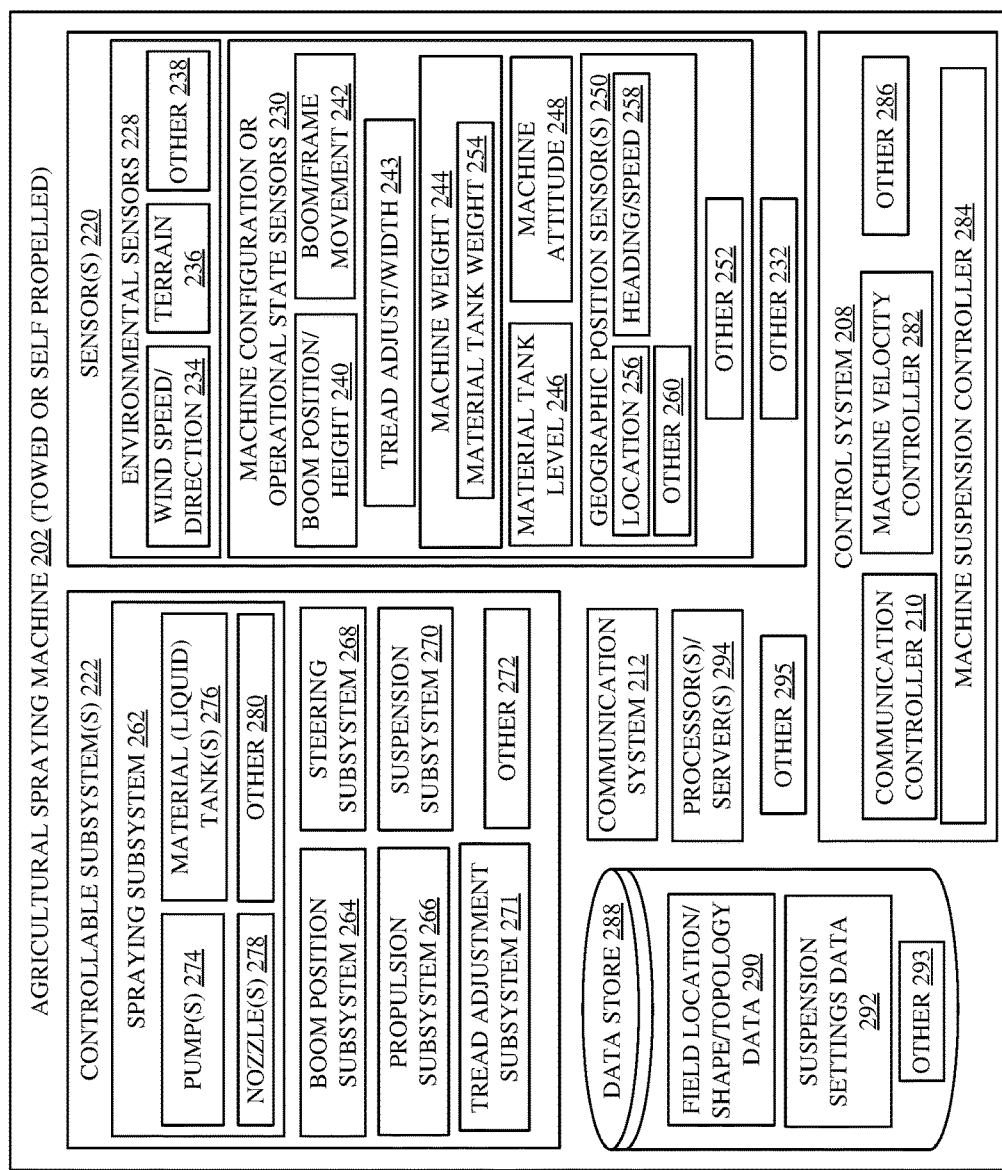
FIG. 3 is a block diagram of one example of an agricultural spraying machine architecture.
Figure 3:
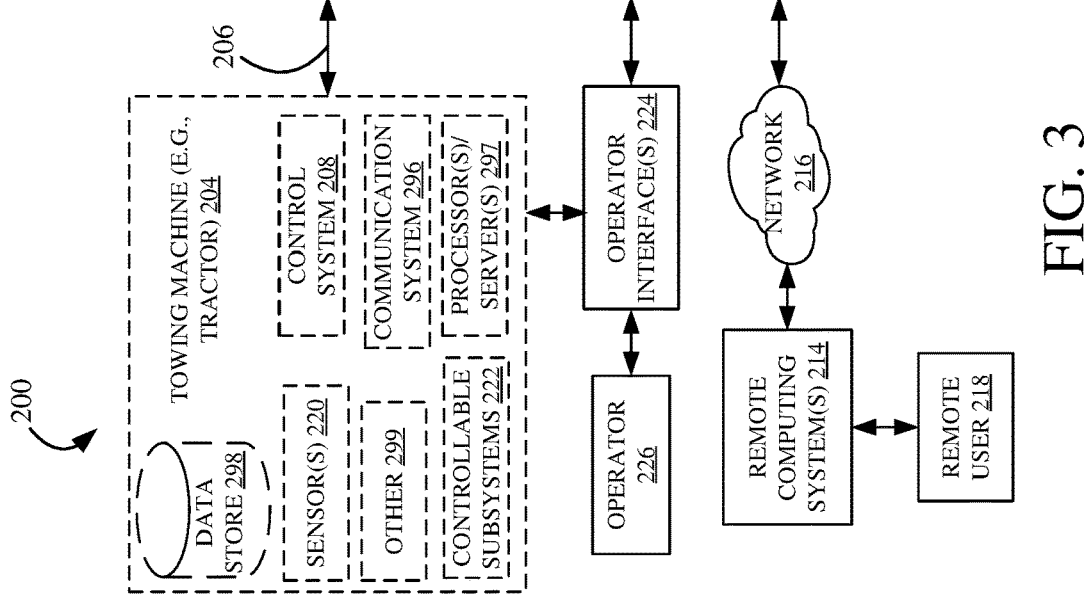

FIG. 3 illustrates one example of an agricultural spraying machine architecture 200 having an agricultural spraying machine 202 configured to perform a spraying operation on an agricultural field. Examples of agricultural spraying machine 202 include, but are not limited to, sprayers 100 and 150 illustrated in FIGS. 1 and 2. Accordingly, machine 202 can comprise a towed implement or machine 202 can be self-propelled. FIG. 3 includes a dashed box 204 representing a towing machine, such as a tractor that is coupled to machine 202 through one or more links 206 (electrical, mechanical, pneumatic, etc.).

A control system 208 is configured to control components and systems of machine 202. For instance, control system 208 includes a communication controller 210 configured to control a communication system 212 to communicate between components of machine 202 and/or with other systems, such as remote computing system 214 over a network 216. Network 216 can be any of a wide variety of different types of networks such as the Internet, a cellular network, a local area network, a near field communication network, or any of a wide variety of other networks or combinations of networks or communication systems.

A remote user 218 is shown interacting with remote computing system 214. Remote computing system 214 can be a wide variety of different types of systems. For example, remote computing system 214 can be a remote server environment that is used by remote user 218. Further, remote computing system 214 can be a mobile device, remote network, or a wide variety of other remote systems. Remote computing system 214 can include one or more processors or servers, a data store, and other items as well.

Communication system 212 can include wireless communication logic, which can be substantially any wireless communication system that can be used by the systems and components of machine 202 to communicate information to other items, such as between computing system 208, sensor(s) 220, and controllable subsystems 222. In one example, communication system 212 communicates over a controller area network (CAN) bus (or another network, such as an Ethernet network, etc.) to communicate information between those items. This information can include the various sensor signals and output signals generated by the sensor variables and/or sensed variables.

Control system 208 is configured to control interfaces, such as operator interface(s) 224 that include input mechanisms configured to receive input from an operator 226 and output mechanisms that render outputs to operator 226. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Sensor(s) 220 can include any of a number of different types of sensors. In the illustrated example, sensor(s) 220 include environmental sensor(s) 228 configured to sense characteristics of the environment in which machine 202 is operating, machine configuration or operational state sensor(s) 230 configured to sense configuration or operational characteristics of machine 202, and can include other sensor(s) 232 as well.

Example environmental sensor(s) 228 include weather sensors, such as wind speed and/or direction sensor(s) 234, terrain sensor(s) 236, and can include other sensor(s) 238. Sensor(s) 234 are configured to sense a wind speed and/or direction on the field during operation of machine 202. Terrain sensor(s) 236 are configured to sense characteristics of the field over which machine 202 is currently traveling or about to travel. For instance, sensor(s) 236 can detect the topography of the field to determine the degree of slope of various areas of the field, detect a boundary of the field, detect obstacles or other objects on the field (such as rocks, trees, etc.), among other things. In one example, one or more of sensor(s) 236 comprise an imaging system having image capture components configured to capture images and image processing components configured to process those images. In one example, image capture components include a stereo camera configured to capture video of the field being operated upon. An example stereo camera captures high definition video at thirty frames per second (FPS) with one hundred and ten degree wide-angle field of view. Of course, this is for sake of example only.

Example machine configuration or operational state sensor(s) 230 include boom position and/or height sensor(s) 240, boom and/or frame movement sensor(s) 242, tread adjust sensor(s) 243, machine weight sensor(s) 244, material tank level sensor(s) 246, machine attitude sensor(s) 248, geographic position sensor(s) 250, and can include other sensor(s) 252 as well.

Sensor(s) 240 are configured to sense the current position and/or height of the boom of machine 202. Sensor(s) 242 are configured to sense movement of the boom. The sensors can be mounted on the boom, mounted on the frame that the boom is coupled to, or positioned otherwise. The sensors can include any suitable type of sensors including, but not limited to, accelerometers, gyroscopes, IMUs, to name a few.

Tread adjust sensor(s) 243 are configured to detect machine tread width settings. This is discussed in further detail below. Machine weight sensor(s) 244 are configured to generate a sensor signal indicative of a weight of machine 202, or a portion thereof. The signal can be utilized as an indication of load carried by the ground-engaging elements (e.g., wheels, tracks, etc.) of machine 202. In one example, sensor(s) 244 include one or more material tank weight sensor(s) 254 configured to generate sensor signals indicative of a weight of material in material tank(s) on machine 202. Thus, control system 208 can determine the weight of material tank(s) by directly sensing the load. Alternatively, or in addition, control system 208 can determine the weight of a material tank based on sensor signals from material tank level sensor 254.

Geographic position sensor(s) 250 include location sensor(s) 256, heading/speed sensor(s) 258, and can include other sensor(s) 260 as well. Location sensor(s) are configured to determine a geographic position of the machine 202 on the field. Location sensor(s) 256 can include, but are not limited to, a Global Navigation Satellite System (GNSS) receiver that receives signals from a GNSS satellite transmitter. Location sensor(s) 256 can also include a Real-Time Kinematic (RTK) component that is configured to enhance the precision of position data derived from the GNSS signal.

Sensor(s) 258 are configured to determine a speed at which machine 202 is traversing the field during the spraying operation. Sensor(s) 258 can be configured to sense the movement of ground-engaging elements (e.g., wheels or tracks) and/or can utilize signals received from other sources, such as location sensor(s) 256.

Controllable subsystems 222 illustratively include a spraying subsystem 262, boom position subsystem 264, a propulsion subsystem 266, a steering subsystem 268, a suspension subsystem 270, a tread adjustment subsystem 271, and can include other subsystems 272 as well.

Spraying subsystem 262 includes one or more pumps 274 configured to pump material from tanks 276 through conduits to nozzles 278 mounted on the boom. Spraying subsystem 262 can include other items 280 as well.

Boom position subsystem 264 is configured to move the boom from a storage or transport position to a deployed position. In one example, boom position subsystem 264 includes actuators that are coupled to the boom and pivot the boom relative to a center or main frame.

Propulsion subsystem 266 is configured to propel machine 202 across the field. Propulsion subsystem 266 can include a power source, such as an internal combustion engine, and a set of ground-engaging elements, such as wheels or tracks. Steering subsystem 268 configured to control the heading of the machine, by steering the ground-engaging elements.

Suspension subsystem 270 is coupled to and supports the machine relative to the ground-engaging elements. Suspension subsystem 270 operably couples a frame of machine 202 to the ground-engaging elements (e.g., wheels, tracks, etc.). Suspension subsystem 270 includes one or more biasing elements, such as springs (e.g., mechanical springs, air springs, etc.), configured to apply a biasing force against the frame, which sets suspension system 270 at a particular stiffness and/or machine 202 at a particular ride height. That is, the biasing force of suspension subsystem 270 defines the stiffness of the ride experienced by operator 226 as the machine traverses the terrain. Suspension subsystem 270 can also include shock absorbers and other linkages that connects machine 202 to the ground-engaging elements.

Tread adjustment subsystem 271 is configured to controllably adjust the tread width of machine 202. For example, machine 202 can include movable axels that allow the width of the ground engaging elements (e.g., wheels, tracks, etc.) to be aligned to the width of the crop rows in the field being operated upon. In some instances, suspension performance can be significantly impacted by tread width adjustments. Tread adjust sensor(s) 243 are configured to generate sensor signals indicative of the tread width (e.g., ground-engaging element position) by directly sensing the ground-engaging elements and/or detecting operation of tread adjustment subsystem 271.

As illustrated in FIG. 3, control system 208 includes a machine velocity controller 282 configured to control the velocity of machine 202 by generating control signals for propulsion subsystem 266. Control system 208 also includes a machine suspension controller 284 configured to control suspension subsystem 270, discussed in further detail below, and can include other items 286 as well.

Machine 202 includes a data store 288 configured to store data for use by machine 202, such as field data 290 and/or suspension settings data 292. Examples of field data 290 include field location data that identifies a location of the field to be operated upon by machine 202, field shape information that identifies a shape of the field, and field topology data that defines the topology of the field. Examples of suspension settings data 292 include a selected or desired ride height and/or biasing force factors for suspension subsystem 270 correlated to particular terrain locations and/or operational settings or characteristics. For example, a user can set desired stiffness, damping, and/or ride-height settings for different in-field operations and on-road (or transport) operations. Data store 288 can store other items 293 as well.

Machine 202 is also illustrated as including one or more processors or servers 294, and can include other items 295 as well.

As also illustrated in FIG. 3, where a towing machine 204 tows agricultural spraying machine 202, towing machine 204 can include some of the components discussed above with respect to machine 202. For instance, towing machine 204 can include some or all of sensor(s) 220, component(s) of control system 208, and some or all of controllable subsystems 222. Also, towing machine 204 can include a communication system 296 configured to communicate with communication system 212, one or more processors or servers 297, a data store 298, and can include other items 299 as well.

Machine suspension controller 284 of control system 208 is configured to control suspension subsystem 270 based on a configuration or operational state of machine 230. Signals from sensors 220 indicate detected operational characteristics, such as, but not limited to, current and/or future machine speed, machine attitude or rotation, changes due to terrain characteristics, terrain objects, weather conditions, loading, speed, etc. As discussed in further detail below, the detected operational characteristics can be based on one or more of a priori data collected by control system 208 or in situ data generated based on sensor inputs, as well as user-defined parameters or other inputs.

Figure 4:
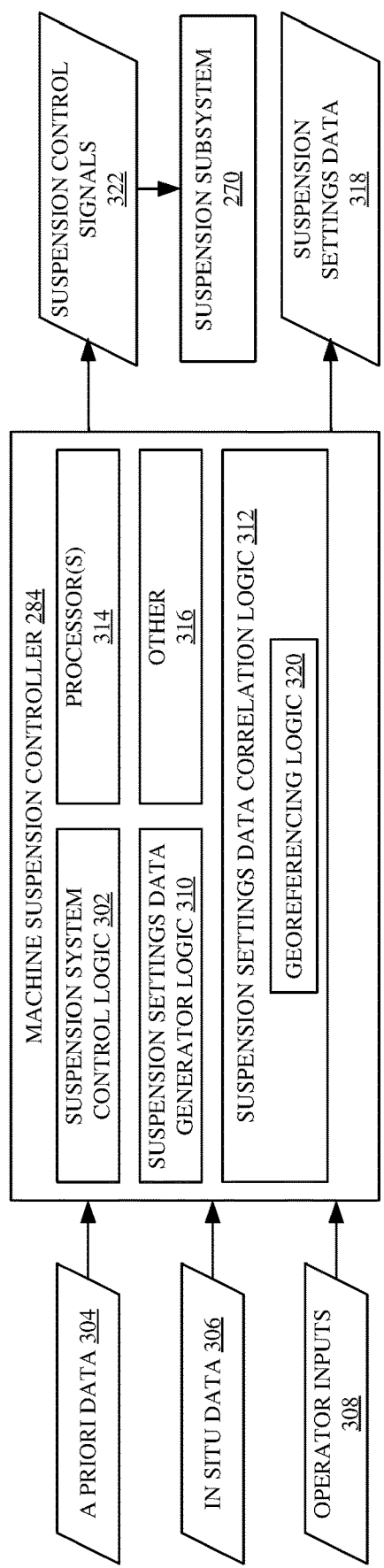
FIG. 4 is a block diagram illustrating one example of a machine suspension controller.

FIG. 4 is a block diagram illustrating one example of machine suspension controller 284 that includes suspension system control logic 302 configured to receive one or more inputs such as, but not limited to, a priori data 304, in situ data 306, and/or operator inputs 308 from operator 226 through operator interfaces 224. A priori data 304 can be geo-referenced to locations in the field (or other terrain) upon which machine 202 is operating and can represent any of a variety of different operational states, such as machine configurations, commanded movements, environmental conditions, etc. This is discussed in further detail below. Illustratively, a priori data 304 is generated prior to the current operation of machine 202. The data can be generated by machine 202, or another machine or system (e.g., system 214). One example includes a terrain or field map that identifies field characteristics, such as slope, soil condition, to name a few. Also, received map data can identify a projected or planned machine path, etc. For example, map data can identify headland turns in the field for the current machine operation. In another example, map data can identify turns along a roadway being traveled by the machine.

In situ data 306 includes data generated based on sensor signals obtained during the current operation of machine 202. For example, this data is obtained concurrently with operation of machine 202 based on sensor signals generated by sensors 220. The in situ data 306 can represent any of a variety of operational states related to the current operation of machine 202. Examples include environmental characteristics, such as weather conditions, terrain conditions or topology, to name a few. Also, the in situ data can represent a configuration of machine 202, such as configurations of controllable subsystems 222. One example includes an indication as to whether the spray booms of spraying subsystem 262 are in a deployed position or a stowed/transport position. Further, the in situ data can represent a speed or heading of machine 202, machine attitude, material levels, machine weight, etc. Operator inputs 308 can indicate suspension settings provided by operator 226 through operator interfaces 224.

Controller 284 includes suspension settings data generator logic 310, suspension settings data correlation logic 312, one or more processors 314, and can include other items 316 as well. Suspension settings data generation logic 310 is configured to generate suspension settings data 318 based on the inputs received by controller 284. For example, as discussed in further detail below, suspension settings can define a particular force-to-displacement relationship (e.g., the spring rate or constant, or stiffness) of suspension subsystem 270.

At this point, it may be worth noting that suspension subsystem 270 can have a number of independently controllable sections. In the case of machine 202 having a pair of front ground-engaging elements (e.g., wheels, tracks, etc.) and a pair of rear ground-engaging elements, suspension subsystem 270 can have a single controllable section that jointly controls the spring rate or stiffness of the suspension coupling all four ground-engaging elements. In another example, suspension subsystem 270 includes a pair of controllable sections, that being a first or front controllable section for the pair of front-ground engaging elements and a second or rear controllable section for the rear ground-engaging elements. In yet another example, suspension subsystem 270 can have four controllable sections, each corresponding to one of the ground-engaging elements. In this way, the spring rate or stiffness of the suspension coupling each ground-engaging element is independently controllable of the other ground-engaging elements. In either case, each controllable section of suspension subsystem 270 corresponds to one or more of the ground-engaging elements of machine 202.

Logic 312 illustratively includes geo-referencing logic 320 configured to correlate or map suspension settings data 318 to particular geographic locations. In this way, the suspension settings data 318 can be utilized during subsequent operation of machine 202, to control suspension subsystem 270 based on the suspension settings data 318. For example, geo-referenced suspension settings data can indicate automatic and/or operator selected adjustments made to the suspension settings (i.e., for one or more controllable sections of suspension subsystem 270) during a prior operation of machine 202 on a field. Suspension settings data 318 maps these suspension settings to the corresponding locations on the field at which they were used. Suspension settings data 318 can be stored in data store 288, as indicated at suspension settings data 292.

Control logic 302 generates suspension control signals 322 to implement the suspension settings. The control signals 322 are provided to control suspension subsystem 270. As noted above, suspension control signals 322 can correspond to multiple different independently controllable sections of suspension subsystem 270. That is, a suspension control signal 322 can set different spring rate or stiffness settings for one or more of the ground-engaging elements.

Accordingly, rather than using a predefined or present tuning (e.g., operating at a nominal vehicle ride height with a fixed suspension response or stiffness), suspension system 270 is dynamically adjustable during operation to accommodate changes in operational states (environmental and/or machine configuration). This can improve performance of the machine. For sake of illustration, the case of an example agricultural sprayer, precise application of the agricultural product (e.g., liquid fertilizer, herbicide, etc.) is important to achieve a desired level of effectiveness. If the product is unevenly applied, the product is wasted in areas of over-application, and areas of under-application can experience reduced yields. As the sprayer traverses across the field, disturbances such as changes in wheel height due to ground level changes, impact with objects (such as rocks, trees, etc.), machine turns, and/or wind can induce movement in the boom, which can have undesirable effects on the boom position and orientation, and adversely affect the spraying performance. For example, the disturbances can change the vertical position of the nozzles, and thus the distance of the nozzles to the dispersal area in the field. Also, the dynamic adjustment can improve operator experience. A suspension that is tuned for a soft ride in rough field terrain may be too soft for during on-road transport, and vice versa. For instance, when traveling on-road, narrow winding roads or tight corners can result in a high degree of chassis roll which can be uncomfortable for operator 226.

Figure 5:
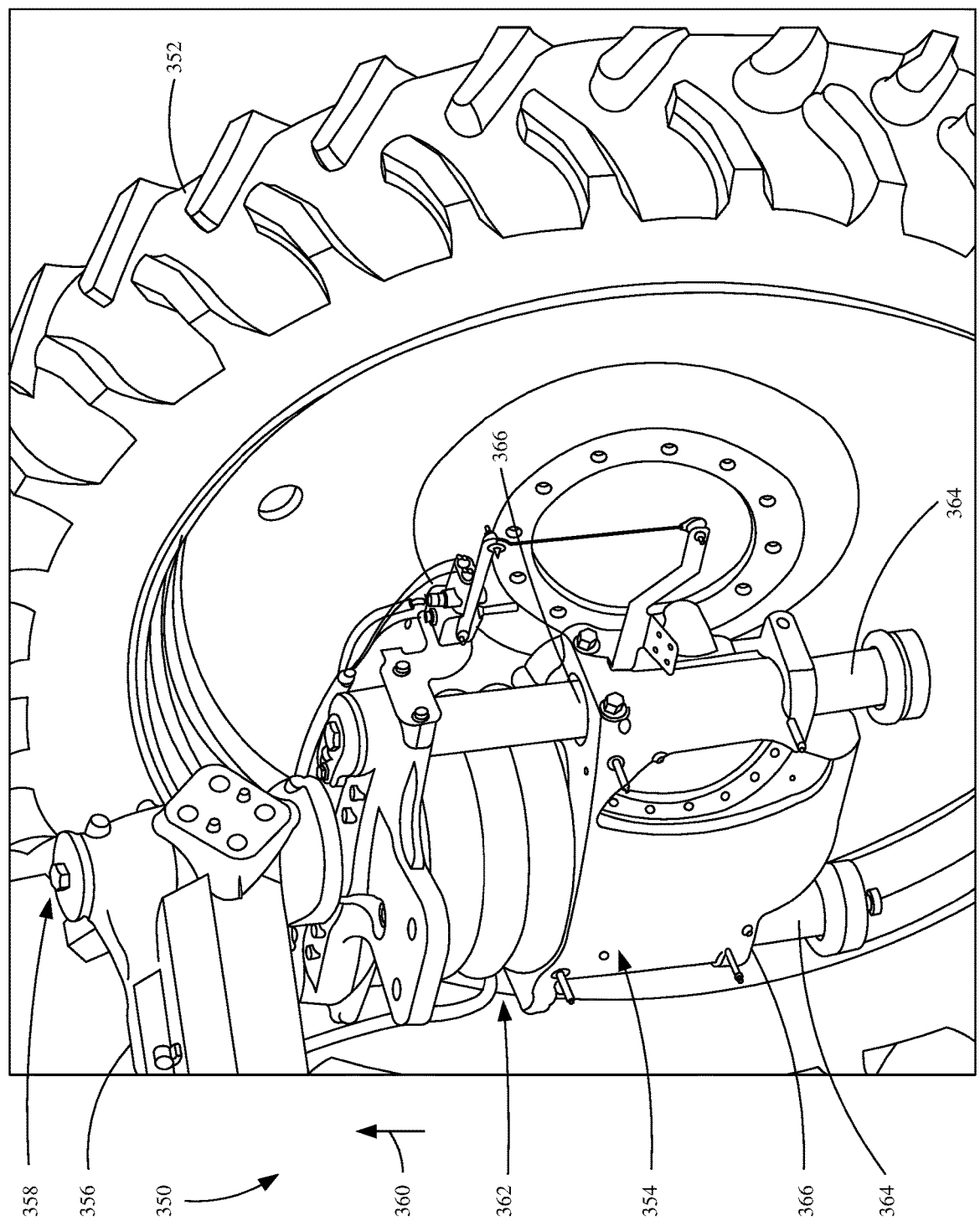
FIG. 5 illustrates one example of a controllable section of a suspension subsystem.

FIG. 5 illustrates one example of a controllable section 350 of suspension subsystem 270. As shown, a ground-engaging element 352 (illustratively a wheel) is mounted to a hub driven by a shaft (not shown in FIG. 5). The hub is carried on a pivotable assembly 354, that is pivotably coupled to frame 356 at connection 358. Rotation of assembly 354 is controlled by steering subsystem 268.

Section 350 is configured to apply a force, generally represented by arrow 360, for a given displacement of frame 356 relative to element 352. The applied force is a function of a force-to-displacement relationship defined by the configuration of section 350. In the illustrated example, section 350 includes an air spring 362 operably positioned between the hub and frame 356. An air spring refers to a component that is pneumatically driven to create a force in relation to deflection or displacement of the air spring. Examples include, but are not limited to, an air bag or air bellows. Movement of element 352 is constrained by rods or pistons 364 that are moveably disposed within cylinders 366 formed in assembly 354. As discussed in further detail below, the force-to-displacement relationship of air spring 362 is controlled by increasing or decreasing the volume of air within the air spring 362 through control of a source of pressurized air, such as an air pump or compressor.

Figure 6:
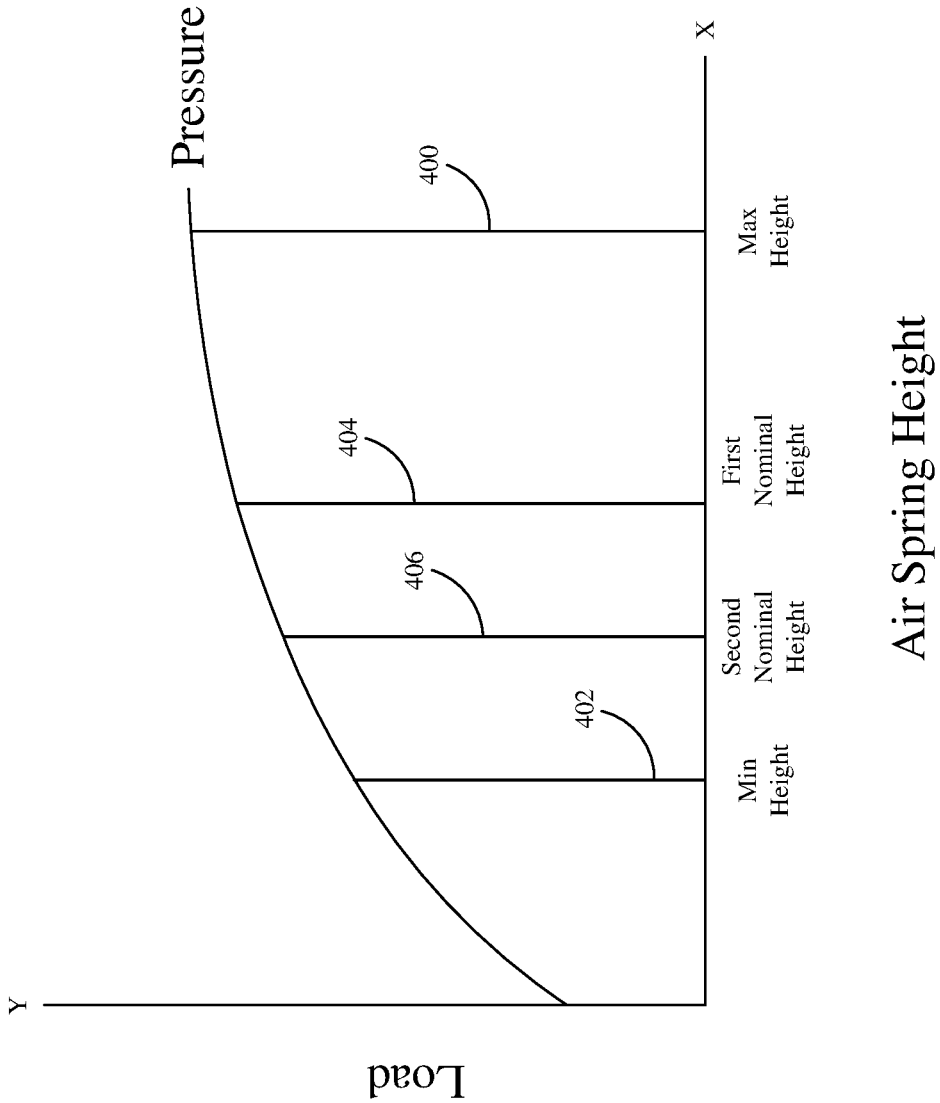
FIG. 6 is a graph illustrating a spring rate curve of an example air spring.

FIG. 6 is a graph illustrating the spring rate curve of air spring 362, in one example. As shown in FIG. 6, air spring 362 has a non-linear relationship between force and displacement, or changes in the air spring height. To illustrate, for air spring heights that are lower (to the left on the x axis), air spring 362 has a higher spring rate, resulting in increased stiffness, whereas higher spring height (to the right on the x axis) have lower spring rates or a softer (less stiff) suspension performance.

In accordance with one example, suspension subsystem 270 has a plurality of air spring height adjustment points between a maximum height (represented at reference numeral 400) and a minimum height (represented at reference numeral 402). Illustratively, two adjustment points (i.e., dual ride height adjustments) are provided. Of course, more than two adjustment points can be provided by machine suspension controller 284.

Machine suspension controller 284 is configured to adjust the pressure in air spring 362 to achieve a first nominal air spring height (represented at reference numeral 404). Based on inputs during operation of machine 202, machine suspension controller 284 is configured to reduce the pressure in air spring 362 to achieve a second nominal air spring height (represented at block reference numeral 406). One example of a pneumatic system for achieving adjustments to suspension subsystem 270 is discussed below with respect to FIG. 7. Briefly, however, the first nominal air spring height 404 resides at or near the mid-span position between the maximum height 404 and minimum height 402. This, of course, is for sake of example only. Here, air spring 362 allows a range of travel above and below the first nominal height 404 when suspension subsystem 270 is configured at the first ride height set point. For example, air spring 362 allows four inches of travel above and below the first set point. Further, in the illustrated example, the second nominal height 406 is approximately two inches below the first set point 404. Here, air spring 362 also allows a range of travel above and below the second set point, with an increased spring rate or stiffness.

Figure 7:
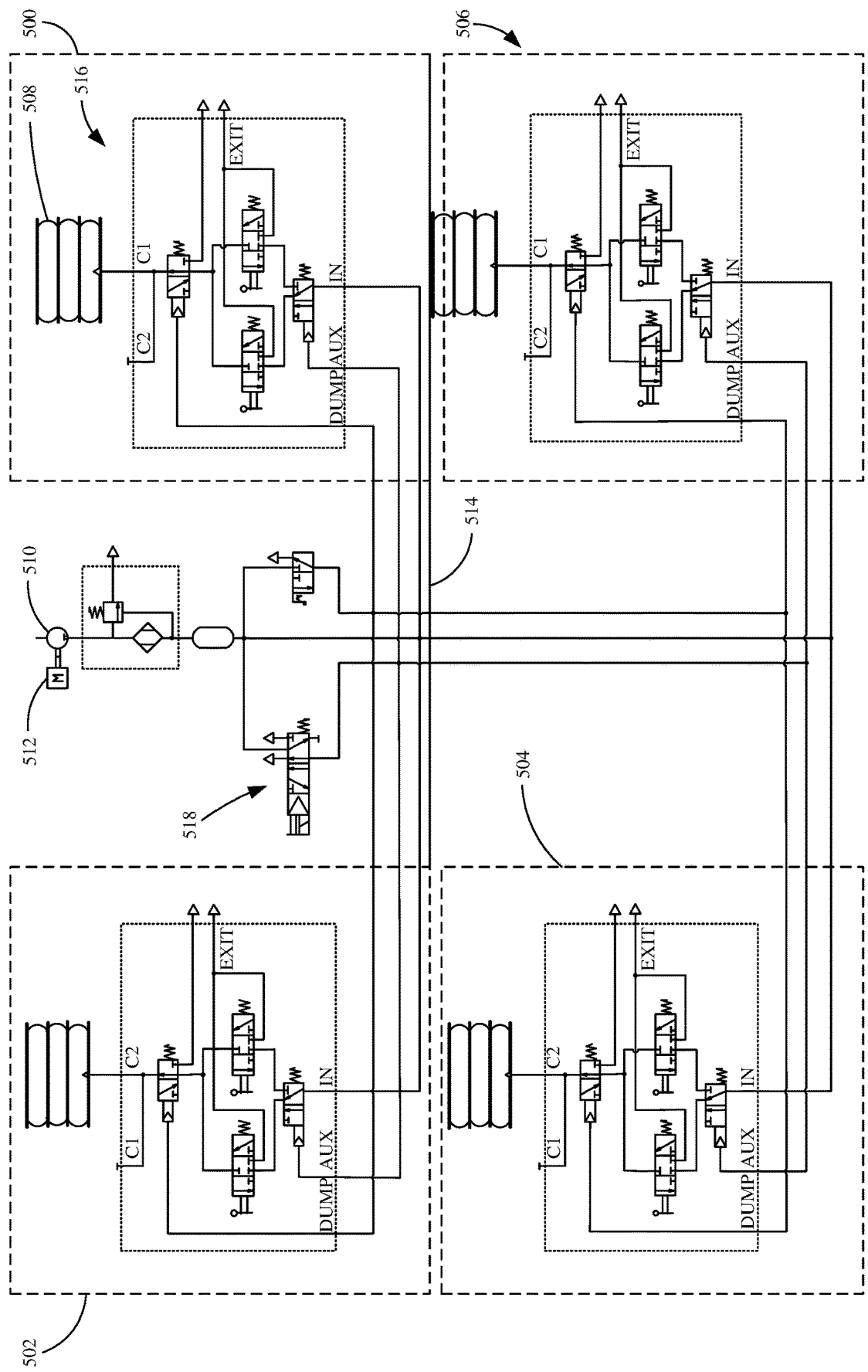
FIG. 7 is a schematic diagram illustrating pneumatic circuitry of an example suspension subsystem.

FIG. 7 is a schematic diagram illustrating pneumatic circuitry of suspension subsystem 270, in one example. As shown, suspension subsystem 270 has a plurality of controllable sections 500, 502, 504, and 506. For sake of discussion, section 500 will be described in further detail. It is noted that sections 502, 504, and 506 can include similar components as section 500.

Section 500 includes an air spring 508 (illustratively an air bag). A compressor 510 is driven by a motor 512 to provide pressurized airflow along a valve supply or inlet line 514. A dual ride height suspension valve 516 is actuated by pilot pressure applied by actuation of a two-position, three-way valve 518. This changes the suspension height control from the primary control valve to the secondary control valve. Under control from the second nominal height control valve, the suspension height is driven to the second nominal height position at which the slope of the spring rate curve is different than that at the first nominal height.

Figures 1, 8:
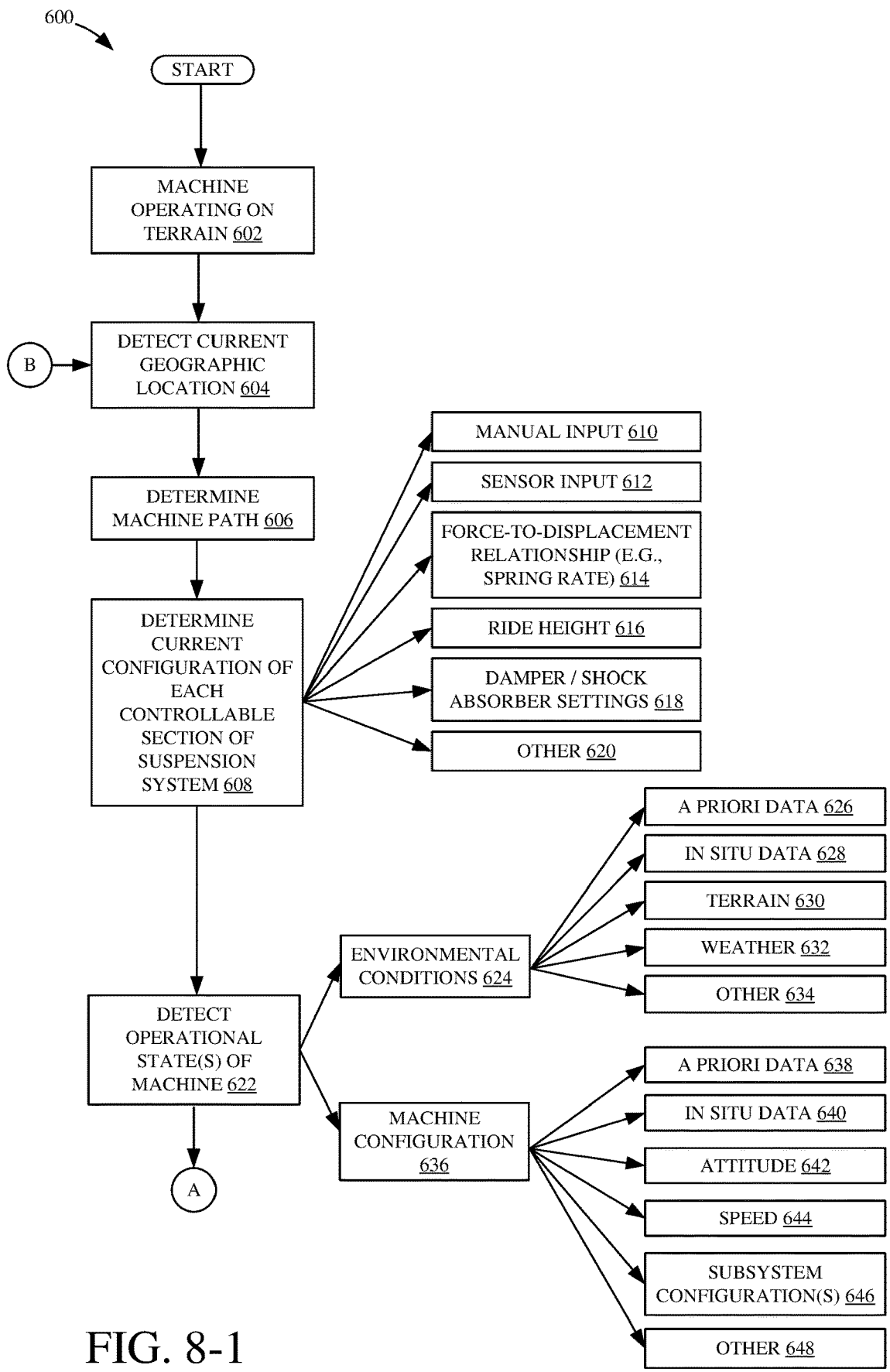
Figures 2, 8:
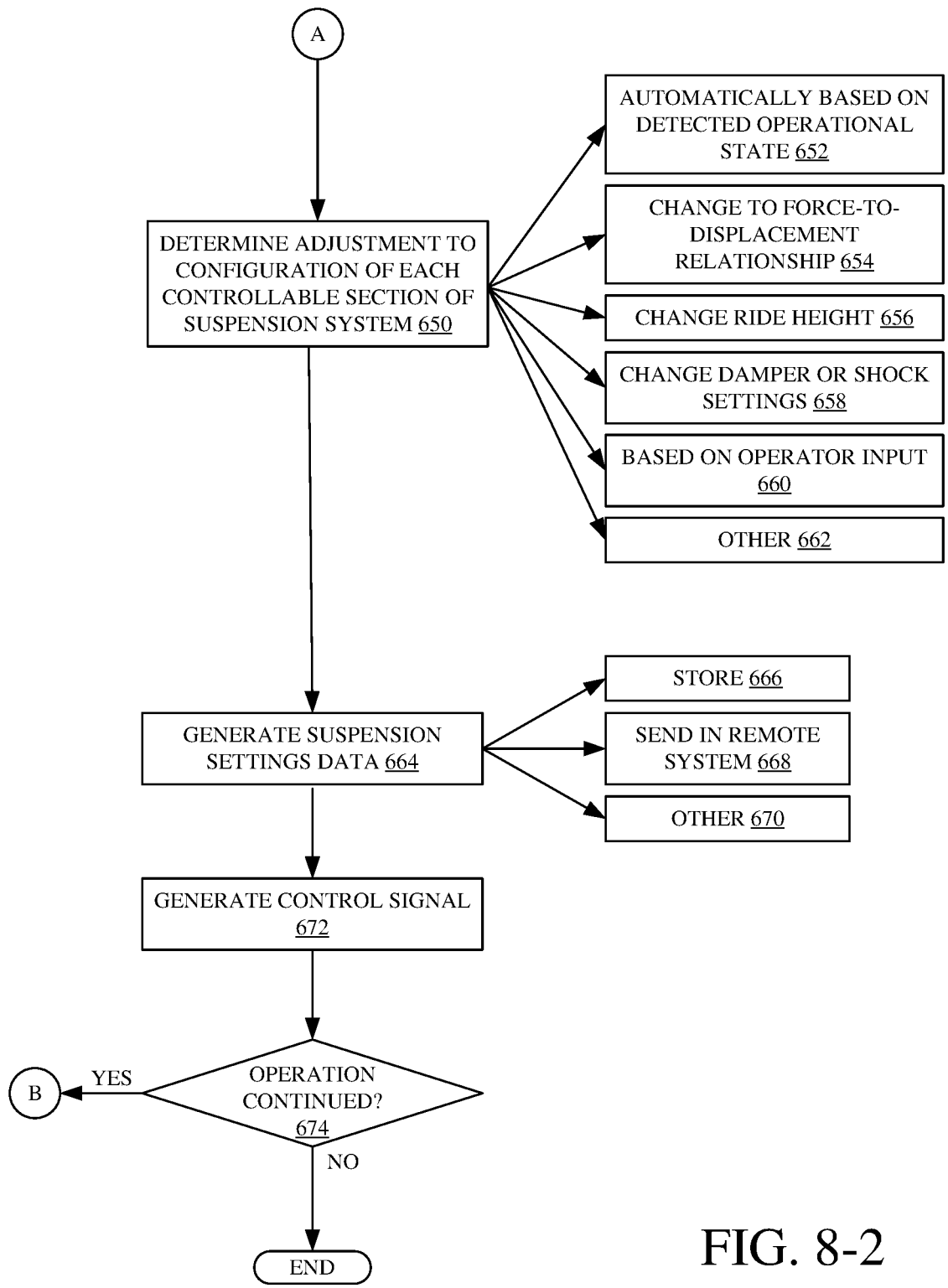

FIGS. 8-1 and 8-2 (collectively referred to as FIG. 8) is a flow diagram 600 illustrating an example operation to control a suspension system of an agricultural machine. For sake of illustration, but not by limitation, FIG. 8 will be described in the context of machine suspension controller 284 controlling suspension subsystem 270 of machine 202, illustrated in FIG. 3.

At block 602, control system 208 determines that machine 202 is operating on a particular terrain. This can include detecting a current geographic location at block 604 and determining a machine path at block 606. For example, control system 208 can receive operator inputs that identify a field under operation along with a field plan for traversing the field during the operation.

At block 608, control system 208 identifies a current configuration of each controllable section of suspension subsystem 270. As discussed above, suspension subsystem can include one or more controllable section, where each controllable section includes one or more ground-engaging elements.

In one example, the current configuration can be determined based on manual operator input at block 610. For example, operator 226 can set the stiffness of suspension subsystem 270. In another example, a sensor input can be received from sensors 220 which indicate current settings of suspension subsystem 270. The configuration indicates the current force-to-displacement relationship, or spring rate, of each controllable section. This is represented at block 614. Alternatively, or in addition, the configuration can indicate the ride height at block 616, damper and/or shock absorber settings at block 618, and can indicate other configurations as well. This is represented at block 620.

At block 622, one or more operational states of machine 202 are detected. In one example, the operational states indicate environmental conditions, which is represented at block 624 and can include receiving a priori data (block 626) and/or in situ data (block 628). The environmental conditions can indicate terrain characteristics, which is represented at block 630. For example, the terrain characteristics can indicate a terrain topology map received by machine 202 or generated based on input from sensors 220. Alternatively, or in addition, the terrain conditions can indicate soil conditions, such as moisture content, etc. Also, the environmental conditions can indicate weather conditions (block 632), and can indicate other conditions as well. This is represented at block 634.

Also, the operational states detected at 622 can indicate machine configuration at block 636. Again, this can be based on a priori data (block 638) and/or in situ data (block 640). The machine configuration can indicate the current and/or future attitude or rotation of machine 202 about three orthogonal axes (i.e., pitch, roll, yaw) as the machine traverses the terrain (block 642). The machine configuration can also indicate the current or future speed of machine 202. This is represented at block 644. Also, the machine configuration can indicate particular configurations of subsystems 222. This is represented at block 646. For example, block 646 can indicate a current position of the spray boom, that is whether the spray boom is in a deployed or stowed/transport position. In another example, the machine configuration indicates the weight of machine 202 or portions thereof. For instance, a signal from material tank level sensor 246 indicates the amount of material in material tank 276, which can be utilized to determine an estimated weight of machine 202. In another example, the machine configuration indicates the configuration of tread adjustment subsystem 271. Of course, other machine configurations can be detected as well. This is represented at block 648.

At block 650, an adjustment to the configuration of each controllable section of suspension subsystem 270 is determined. In one example, the determined adjustment is performed automatically, based on the detected operational states, detected at block 622. This is represented at block 652. In one example, the determined adjustment comprises a change to the force-to-displacement relationship, at block 654. For example, the spring rate of an air spring in the controllable section is determined.

Alternatively, or in addition, the adjustment can comprise a change to the ride height at block 656. In the example above, a change in ride height is proportional, or otherwise related to, the change to the force-to-displacement relationship at block 654. Also, the adjustment can comprise a change to damper and/or shock settings, at block 658. In one example, adjustable dampers can be deployed in the controllable section. Control orifices on the damper can be adjusted to change the damping force applied by suspension subsystem 270.

The adjustment can be determined based on operator input, at block 660. For example, operator 226 can enter desired suspension stiffness settings through operator interfaces 224. The adjustment to the configuration can be determined in other ways as well. This is represented at block 662.

At block 664, suspension settings data is generated by suspension settings data generator logic 310, discussed above with respect to FIG. 4. This data can be stored at block 666, such as in data store 288. Alternatively, or in addition, the suspension settings data can be sent to a remote system, such as remote system 214. This is represented at block 668. Of course, the suspension settings data can be generated and/or utilized in other ways as well. This is represented at block 670.

At block 672, suspension system control logic 302 generates suspension control signals 322 to control suspension subsystem 270. With respect to the example illustrated in FIG. 7, control signals 322 control actuation of valve 518 to apply pilot pressure to dual ride height suspension valve 516, which operates to change the suspension height control from the primary control valve to the secondary control valve. Under control from the secondary height control valve, the suspension height is driven to the secondary nominal height position at which the slope of the spring rate curve is different than at the primary nominal height. Upon removal of the pilot pressure at the suspension height control valves, the suspension is returned to the primary nominal ride height with the corresponding suspension performance. If, at block 674, operation of machine 202 is continued, operation returns to block 604.

It can thus be seen that the present system provides a number of advantages. For example, but not by limitation, the present control system controls an agricultural machine suspension system based on the configuration or operational state of the machine, which can be based on geo-referenced a priori data as well as in situ data captured by on-board sensors of the machine. Using the detected operational states of the machine, automatic adjustments can be made to the force-to-displacement relationship of the suspension system. For example, the ride height of an air spring suspension is adjusted to change the stiffness of the suspension which can improve the performance of the machine operation as well as improve the operator experience.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. Alternatively, or in addition, input devices are configured to detect gesture commands to control the machine.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
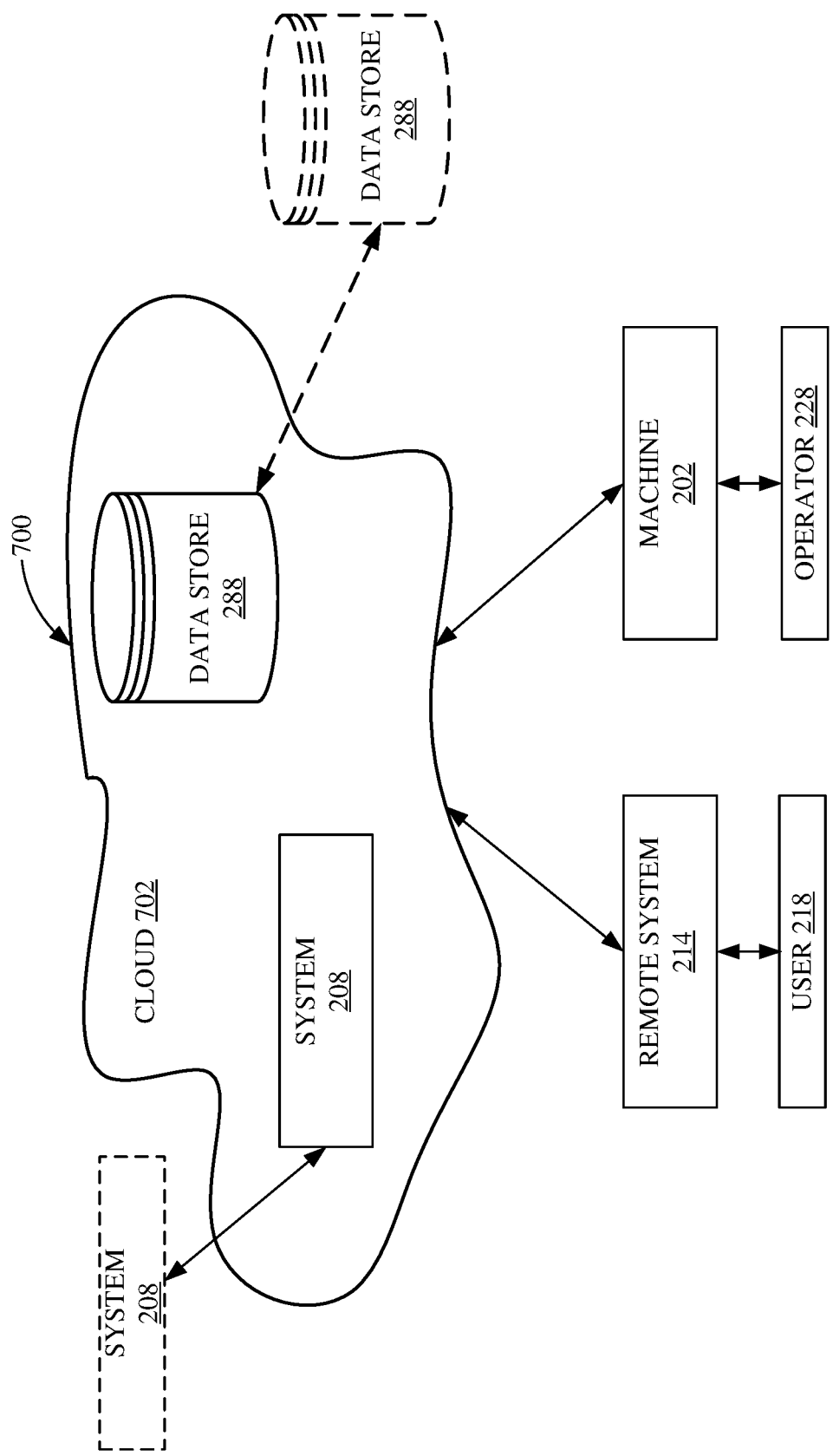
FIG. 9 is a block diagram showing one example of the architecture illustrated in FIG. 3, deployed in a remote server architecture.

FIG. 9 is a block diagram of one example of the agricultural spraying machine architecture, shown in FIG. 3, where agricultural machine 202 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in FIG. 3 and they are similarly numbered. FIG. 9 specifically shows that system 208 and data store 288 can be located at a remote server location 702. Therefore, agricultural machine 202 accesses those systems through remote server location 702.

FIG. 9 also depicts another example of a remote server architecture. FIG. 9 shows that it is also contemplated that some elements of FIG. 3 are disposed at remote server location 702 while others are not. By way of example, data store 288 can be disposed at a location separate from location 702, and accessed through the remote server at location 702. Alternatively, or in addition, system 208 can be disposed at location(s) separate from location 702, and accessed through the remote server at location 702.

Regardless of where they are located, they can be accessed directly by agricultural machine 202, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
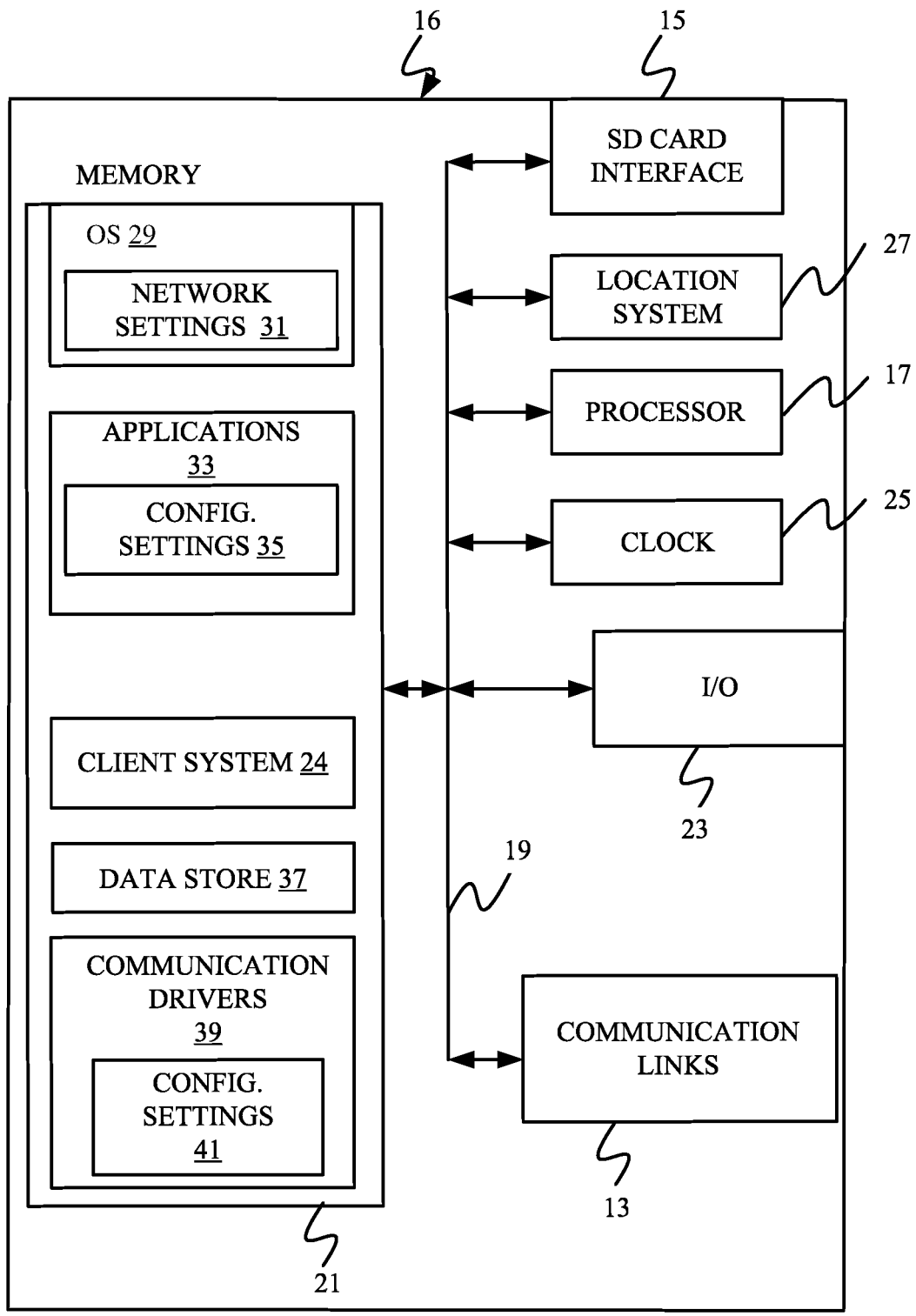
FIGS. 10, 11, and 12 show examples of mobile devices that can be used in the architectures shown in the previous figures.
Figure 11:
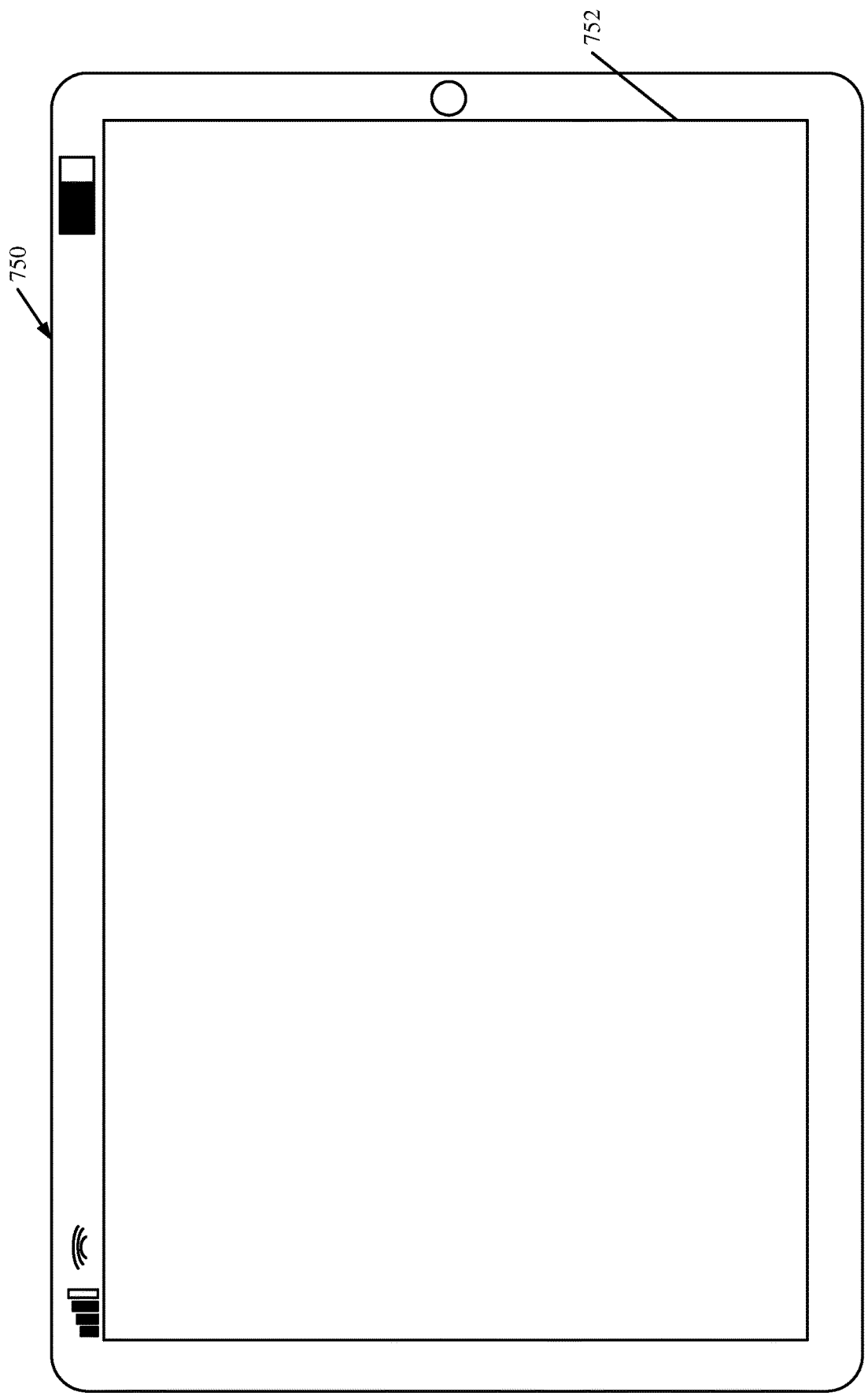
Figure 12:
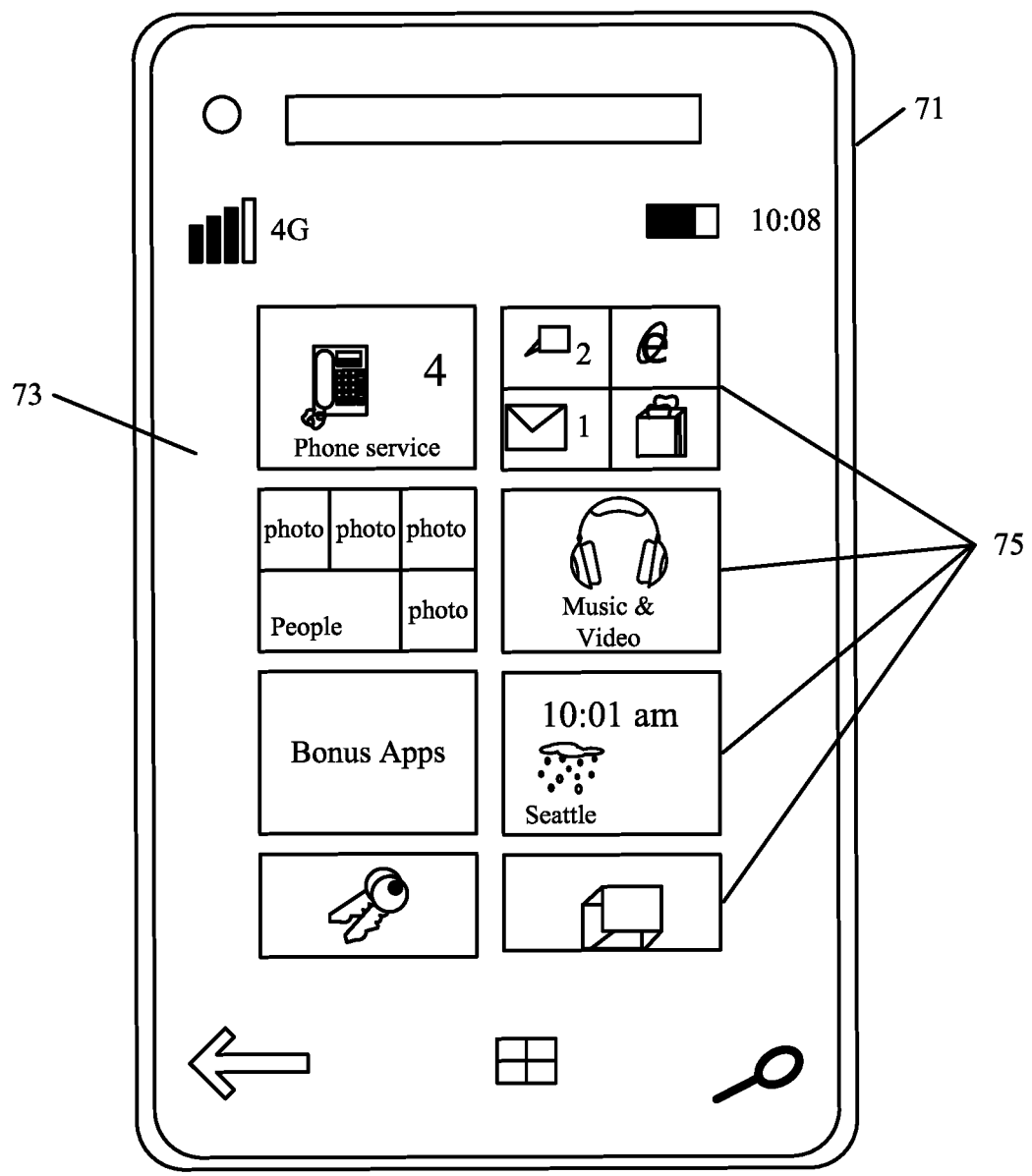

FIG. 10 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural machine 202 or as remote system 214. FIGS. 11-12 are examples of handheld or mobile devices.

FIG. 10 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous 9 FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 750. In FIG. 11, computer 750 is shown with user interface display screen 752. Screen 752 can be a touch screen or a pen-enabled interface that receives inputs from a pen or stylus. Screen 752 can also use an on-screen virtual keyboard. Of course, screen 752 might also be attached to a keyboard or other user input device through a suitable attachment mechanism, such as a wireless link or USB port, for instance. Computer 750 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
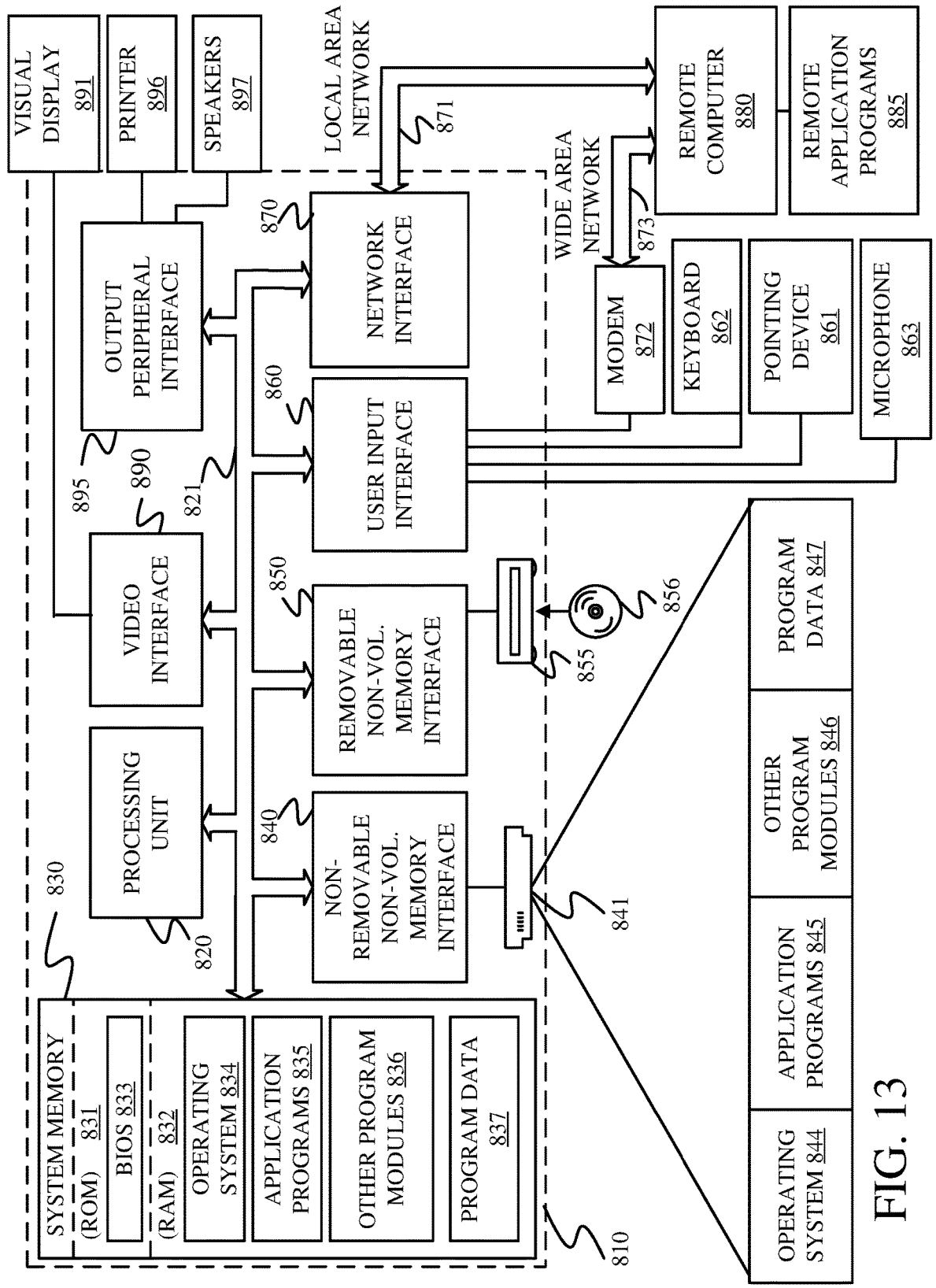
FIG. 13 is a block diagram showing one example of a computing environment that can be used in the architectures shown in the previous figures.

FIG. 13 is one example of a computing environment in which elements of FIG. 3, or parts of it, (for example) can be deployed. With reference to FIG. 13, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICS), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural machine comprising:
a frame;
a ground-engaging element;
a suspension system that movably supports the frame relative to the ground-engaging element, wherein the suspension system is configured to apply, for a given displacement of the frame relative to the ground-engaging element, a force based on a force-to-displacement relationship; and
a control system configured to:
receive an input indicative of an operational state of the agricultural machine during operation on a terrain; and
automatically control the suspension system to adjust the force-to-displacement relationship of the suspension system based on the operational state.

Example 2 is the agricultural machine of any or all previous examples, wherein the input comprises geo-referenced terrain data indicative of terrain characteristics of the terrain.

Example 3 is the agricultural machine of any or all previous examples, wherein the agricultural machine comprises an agricultural sprayer including a spraying system having a material tank configured to store a material to be sprayed and a set of spray nozzles.

Example 4 is the agricultural machine of any or all previous examples, wherein the operational state is indicative of an amount of the material in the material tank.

Example 5 is the agricultural machine of any or all previous examples, wherein the suspension system comprises an air spring configured to support the frame relative to the ground-engaging element, and the control system is configured to adjust a spring rate of the air spring based on the operational state.

Example 6 is the agricultural machine of any or all previous examples, wherein, when configured in the force-to-displacement relationship, the suspension system is positioned at a first ride height, and wherein the control system is configured to adjust the force-to-displacement relationship by changing the suspension system to a second ride height that is different than the first ride height.

Example 7 is the agricultural machine of any or all previous examples, wherein changing the suspension system to a second ride height comprises controlling a height control switching valve to select a control valve from one of a first control valve or a second control valve, wherein the selected control valve controls a flow of pressurized air to the air spring.

Example 8 is the agricultural machine of any or all previous examples, wherein the input comprises in situ data generated based on a sensor signal received during the operation of the agricultural machine.

Example 9 is the agricultural machine of any or all previous examples, wherein the sensor signal is generated by an environment sensor associated with the agricultural machine.

Example 10 is the agricultural machine of any or all previous examples, wherein the sensor signal represents a geographic location of the agricultural machine.

Example 11 is the agricultural machine of any or all previous examples, wherein the sensor signal represents an attitude of the machine.

Example 12 is the agricultural machine of any or all previous examples, wherein the sensor signal represents a configuration of a controllable subsystem of the machine.

Example 13 is the agricultural machine of any or all previous examples, wherein the input comprises a priori data generated prior to the operation of the agricultural machine on the terrain.

Example 14 is a method of controlling an agricultural machine, the method comprising:
   detecting an operational state of the agricultural machine during an operation on a terrain, the agricultural machine comprising a suspension system that movably supports a frame relative to a ground-engaging element and is configured to apply, for a given displacement of the frame relative to the ground-engaging element, a force based on a force-to-displacement relationship;
   determining an adjustment to the force-to-displacement relationship of the suspension based on the operational state; and
   controlling the suspension system based on the determined adjustment to the force-to-displacement relationship.

Example 15 is the method of any or all previous examples, wherein the input comprises geo-referenced terrain data indicative of terrain characteristics of the terrain.

Example 16 is the method of any or all previous examples, wherein the suspension system comprises an air spring configured to support the frame relative to the ground-engaging element, and controlling the suspension system comprises adjusting a spring rate of the air spring based on the operational state.

Example 17 is the method of any or all previous examples, wherein the sensor signal is generated by an environment sensor associated with the agricultural machine.

Example 18 is the method of any or all previous examples, wherein the sensor signal represents a configuration of a controllable subsystem of the machine.

Example 19 is a suspension system for an agricultural spraying machine, the suspension system comprising:
   an air spring configured to support a frame of the agricultural machine relative to a ground engaging element by applying a force against the frame at a spring rate of the air spring; and
   a controller configured to:
      receive terrain data representing terrain characteristics; and
      automatically control the suspension system to adjust the spring rate of the air spring based on the terrain data.

Example 20 is the suspension system of any or all previous examples, wherein
   the agricultural machine comprises an agricultural sprayer including a spraying system having a material tank configured to store a material to be sprayed and a set of spray nozzles, the air spring has a first spring rate at a first ride height, and
   the controller is configured to adjust the air spring to a second spring rate by changing the first ride height to a second ride height.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
   a frame;
   a ground-engaging element;
   a suspension system that movably supports the frame relative to the ground-engaging element, wherein the suspension system comprises an air spring, having a flexible sidewall, configured to apply, for a given displacement of the frame relative to the ground-engaging element, a force based on a force-to-displacement relationship; and
   a control system configured to:
      receive an input indicative of an operational state of the agricultural machine during operation on a terrain; and
      automatically control the suspension system to adjust the force-to-displacement relationship by changing a configuration of the air spring, having the flexible sidewall, to adjust the force-to-displacement relationship of the air spring from a first force-to-displacement relationship to a second force-to-displacement relationship that is different than the first force-to-displacement relationship based on the operational state, wherein changing the configuration of the air spring comprises controlling a switching valve to select a selected control valve from one of a first control valve or a second control valve, wherein the selected control valve controls a flow of pressurized air to the air spring.

2. The agricultural machine of claim 1, wherein the input comprises geo-referenced terrain data indicative of terrain characteristics of the terrain.

3. The agricultural machine of claim 1, wherein the agricultural machine comprises an agricultural sprayer including a spraying system having a material tank configured to store a material to be sprayed and a set of spray nozzles and wherein the operational state is indicative of an amount of the material in the material tank.

4. The agricultural machine of claim 1, wherein the control system is configured to adjust a spring rate of the air spring based on the operational state.

5. The agricultural machine of claim 1, wherein the operational state comprises at least one of an environmental condition or a machine configuration.

6. The agricultural machine of claim 5, wherein the input comprises in situ data generated based on a sensor signal received during the operation of the agricultural machine.

7. The agricultural machine of claim 6, wherein the sensor signal is generated by an environment sensor associated with the agricultural machine.

8. The agricultural machine of claim 6, wherein the sensor signal represents at least one of an attitude of the agricultural machine or a geographic location of the agricultural machine.

9. The agricultural machine of claim 6, wherein the sensor signal represents a configuration of a controllable subsystem of the agricultural machine.

10. The agricultural machine of claim 1, wherein the input comprises a priori data generated prior to the operation of the agricultural machine on the terrain.

11. A method of controlling an agricultural machine, the method comprising:
   detecting an operational state of the agricultural machine during an operation on a terrain, the agricultural machine comprising a suspension system, including a first control valve, a second control valve, a switching valve, and an air spring, having a flexible sidewall, that movably supports a frame relative to a ground-engaging element and is configured to apply, for a given displacement of the frame relative to the ground-engaging element, a force based on a force-to-displacement relationship;

determining an adjustment of the suspension system from a first force-to-displacement relationship to a second force-to-displacement relationship, that is different than the first force-to-displacement relationship, based on the operational state; and controlling the switching valve to select a selected control valve, from one of the first control valve or the second control valve, that controls a flow of pressurized air to the air spring, having the flexible sidewall, based on the determined adjustment.

12. The method of claim 11, wherein receiving the operational state comprises receiving geo-referenced terrain data indicative of terrain characteristics of the terrain.

13. The method of claim 11, wherein controlling the air spring comprises adjusting a spring rate of the air spring based on the operational state.

14. The method of claim 11, wherein receiving the operational state comprises receiving a sensor signal generated by an environment sensor associated with the agricultural machine.

15. The method of claim 11, wherein receiving the operational state comprises receiving a sensor signal representing a configuration of a controllable subsystem of the agricultural machine.

16. A suspension system for an agricultural machine, the suspension system comprising:

an air spring, having a flexible sidewall, configured to support a frame of the agricultural machine relative to a ground engaging element by applying a force against the frame at a spring rate of the air spring; and a controller configured to:
   receive terrain data representing terrain characteristics; and
   based on the terrain data, automatically control the air spring to adjust the spring rate of the air spring by controlling a switching valve to select a selected control valve from one of a first control valve or a second control valve, wherein the selected control valve controls a flow of pressurized air to the air spring.

17. The suspension system of claim 16, wherein
the agricultural machine comprises an agricultural sprayer including a spraying system having a material tank configured to store a material to be sprayed and a set of spray nozzles,
the air spring has a first spring rate at a first ride height, and
the controller is configured to adjust the air spring to a second spring rate by changing the first ride height to a second ride height.

* * * * *